United States Patent [19]

Caprara et al.

[11] Patent Number: 5,412,673
[45] Date of Patent: May 2, 1995

[54] SINGLE LONGITUDINAL MODE LASER WITHOUT SEEDING

[75] Inventors: Andrea L. Caprara, Mountain View; Jean-Marc Heritier, San Jose, both of Calif.

[73] Assignee: Hoya Corporation, Tokyo, Japan

[21] Appl. No.: 172,086

[22] Filed: Dec. 22, 1993

[51] Int. Cl.$^6$ .......................................... H01S 3/098
[52] U.S. Cl. ...................... 372/19; 372/20; 372/38
[58] Field of Search .................... 372/18, 19, 20, 32, 372/38, 103

[56] References Cited

U.S. PATENT DOCUMENTS

| | | | |
|---|---|---|---|
| 4,556,979 | 12/1985 | Scott et al. | 372/20 |
| 4,918,704 | 4/1990 | Caprara et al. | |
| 4,951,285 | 8/1990 | Cole et al. | 372/19 |
| 4,964,132 | 10/1990 | Fischer | 372/19 |
| 5,173,908 | 12/1992 | Negus et al. | 372/20 |
| 5,235,605 | 8/1993 | Rines et al. | 372/20 |

OTHER PUBLICATIONS

Chuang, Ti and Harold J. Metcalf; "Tunable diode-laser-pumped solid state LNA laser for helium spectroscopic experiments"; *Applied Optics*; vol. 30, No. 18, Jun. 1991; pp. 2495-2502.

Oepts, D. and W. B. Colson; "Phase Locking in an Infrared Short-Pulse Free-Electron Laser"; *IEEE Journal of Quantum Electronics*; vol. 26, No. 4; Apr. 1990; pp. 723-730.

Oak, S. M., et al.; "Relaxation oscillation studies in Nd:YAG laser—Some new results"; *Pramana Journal of Physics*; vol. 31, No. 1; Jul. 1988, pp. 41-45.

Basting, D., et al.; "Single-frequency dye laser with 50 ns pulse duration"; *Proceedings of SPIE*; vol. 912; 12-13 Jan. 1988; pp. 87-94.

Rob, M. A. and J. R. Izatt; "Intermodal Tuning Behavior of an Etalon Tuned SLM TEA-CO$_2$ Laser"; *Twelfth International Conference on Infrared and Millimeter Waves*; Dec. 14-18, 1987; p. 376.

H. Hemmati; "Single longitudinal mode operation of semiconductor laser arrays with etalon feedback"; *Applied Physics Letters*; vol. 51, No. 4; 27 Jul. 1987; pp. 224-225.

Chen, K. L. and S. Wang; "Etched-coupled-cavity InGaAsP/InP lasers"; *Electronics Letters*; vol. 21, No. 3; 31 Jan. 1985; pp. 94-95.

Rahn, Larry A.; "Feedback stabilization of an injection-seeded Nd:YAG laser"; *Applied Optics*; vol. 24, No. 7; 1 Apr. 1985; pp. 940-942.

Jackel, S., et al.; "Generation of single longitudinal mode pulses in passively Q-switched lasers via passive pre-lasing"; *Optics Communications*; vol. 47, No. 3; 1 Sep. 1983; pp. 205-211.

Leeb, Walter R.; "Tunability characteristics of wavegide CO$_2$ lasers with internal etalons"; *Applied Optics*; vol. 14, No. 7; Jul. 1975; pp. 1706-1709.

*Primary Examiner*—Rodney B. Bovernick
*Assistant Examiner*—Robert E. Wise
*Attorney, Agent, or Firm*—Majestic, Parsons, Siebert & Hsue

[57] ABSTRACT

The use of feedback circuit in a laser device with a frequency selective element such as an étalon allows for the production of a substantially single longitudinal mode output indefinitely. The feedback circuitry is adapted to adjust the length of the laser cavity so that a longitudinal mode of the laser device is near transmission peak of the frequency selective element.

23 Claims, 14 Drawing Sheets

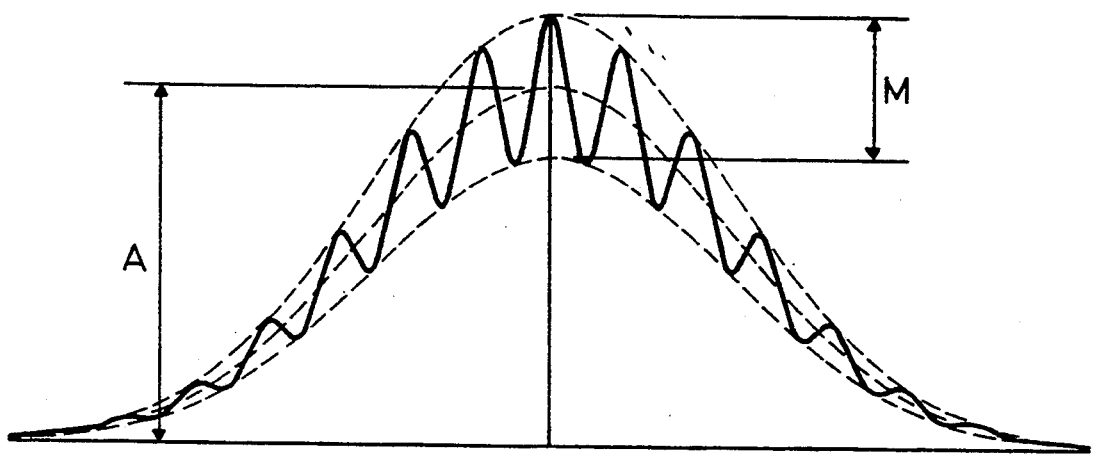
FIG._1.

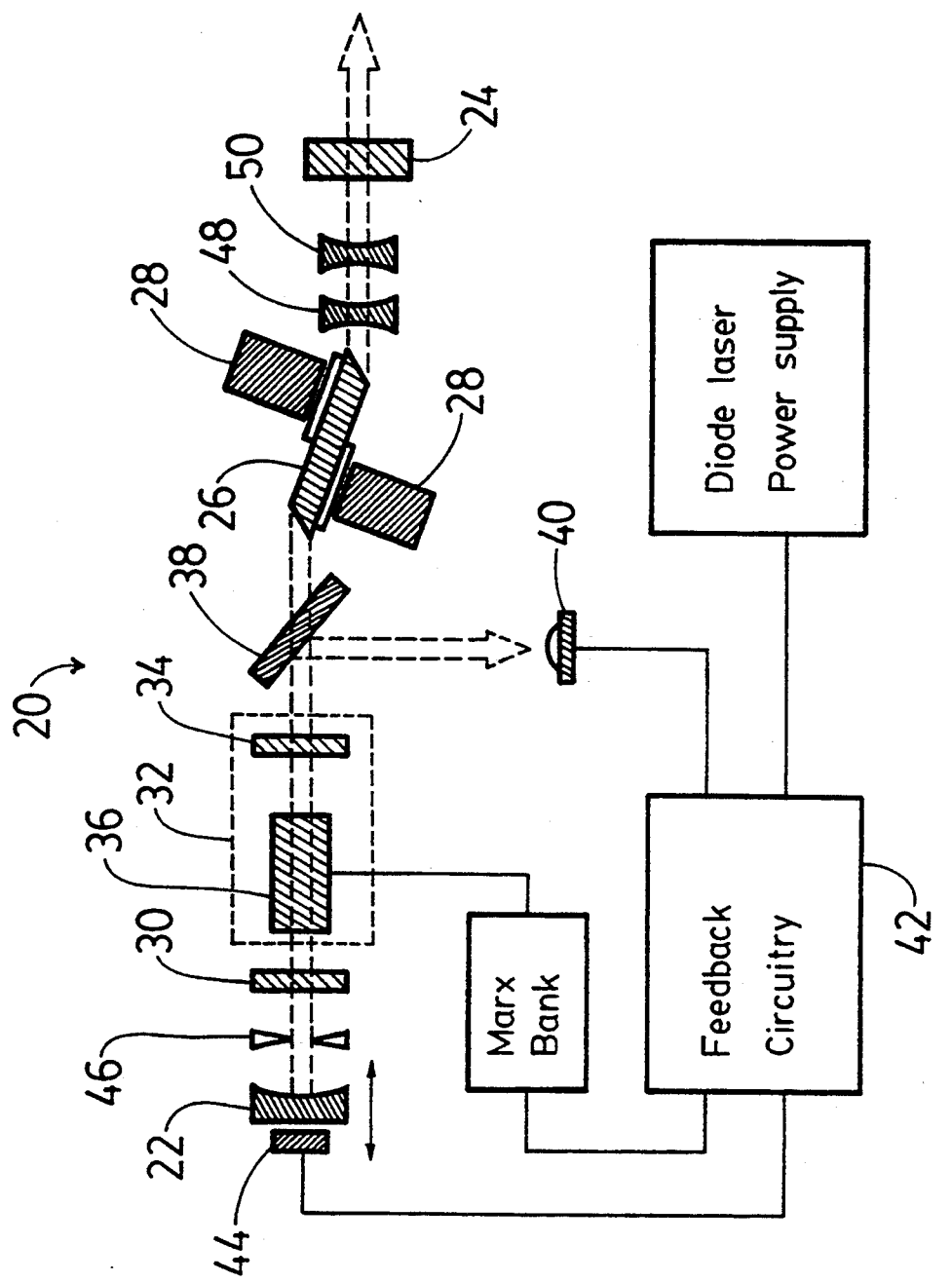
FIG._2.

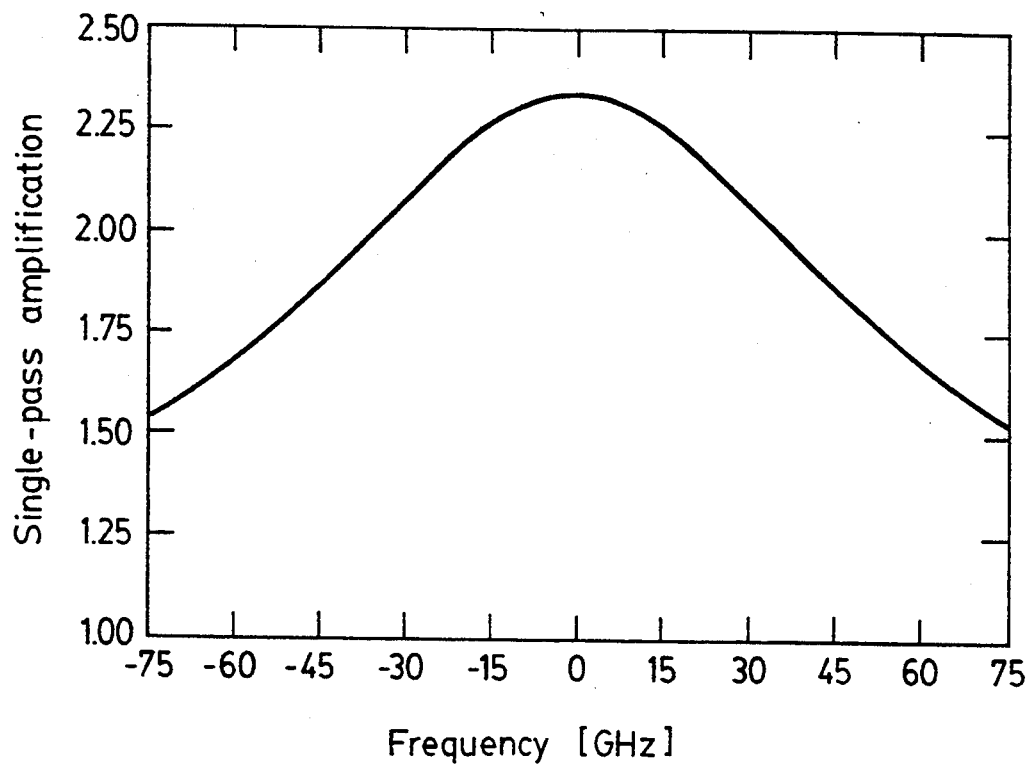
FIG._3.
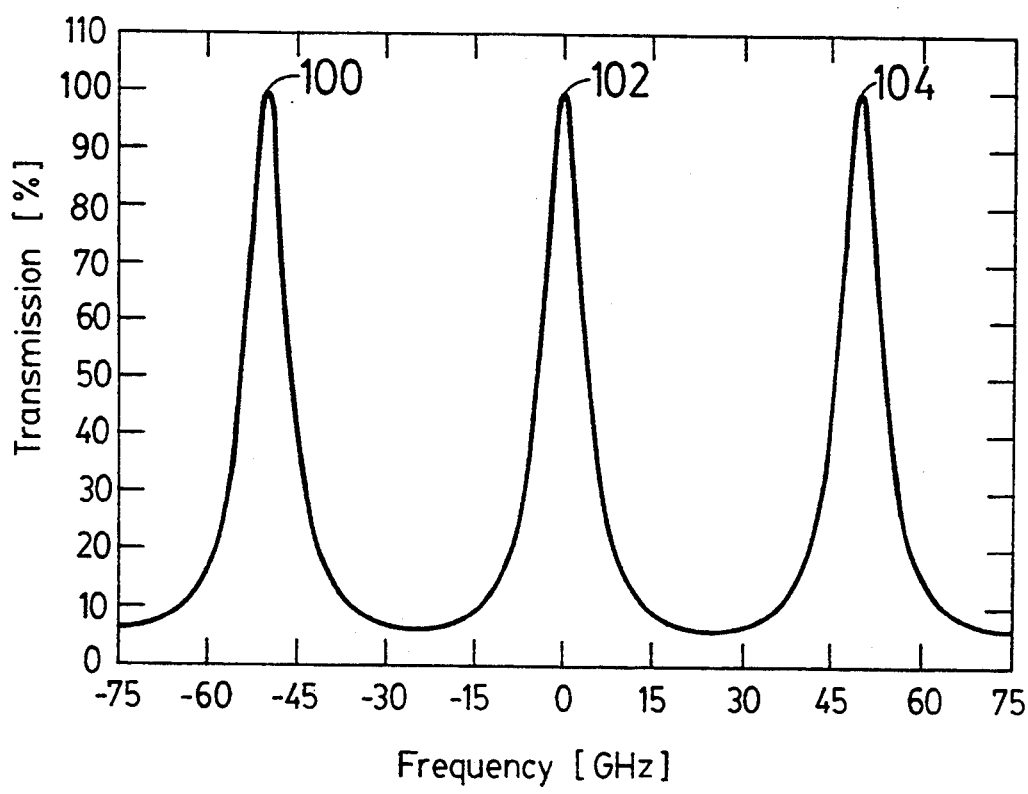
FIG._4.

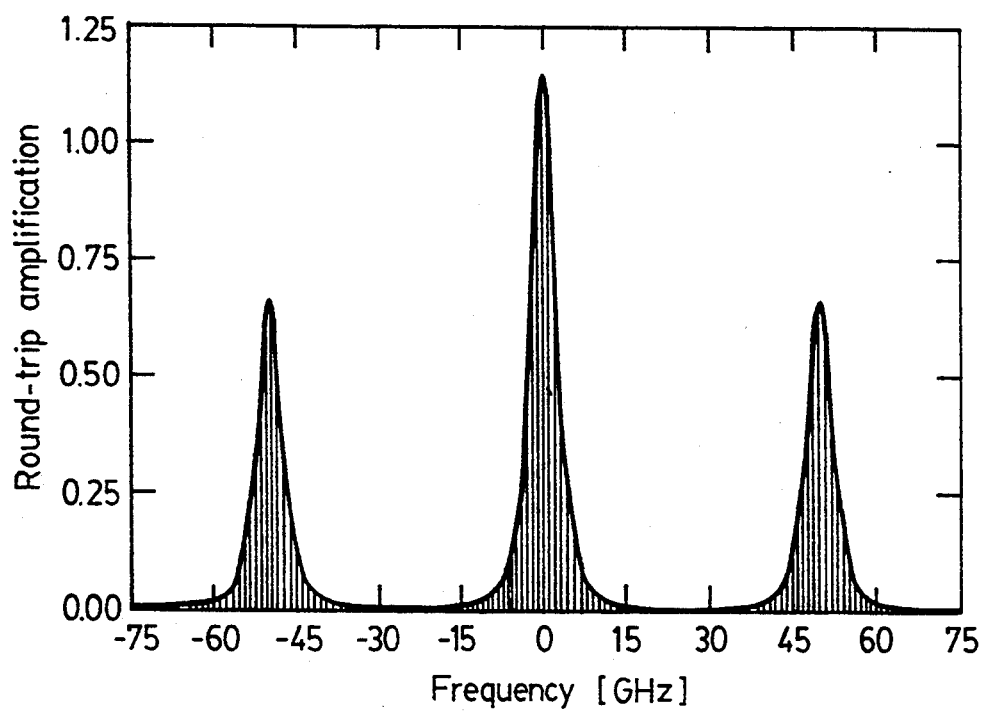
FIG._5.
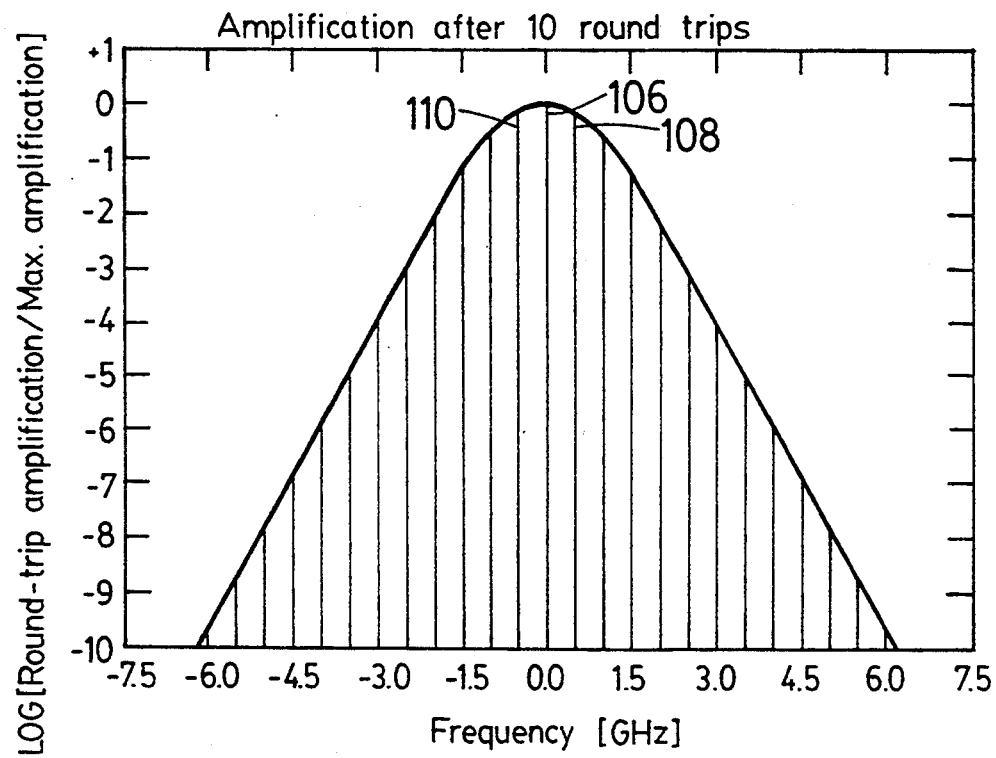
FIG._6.

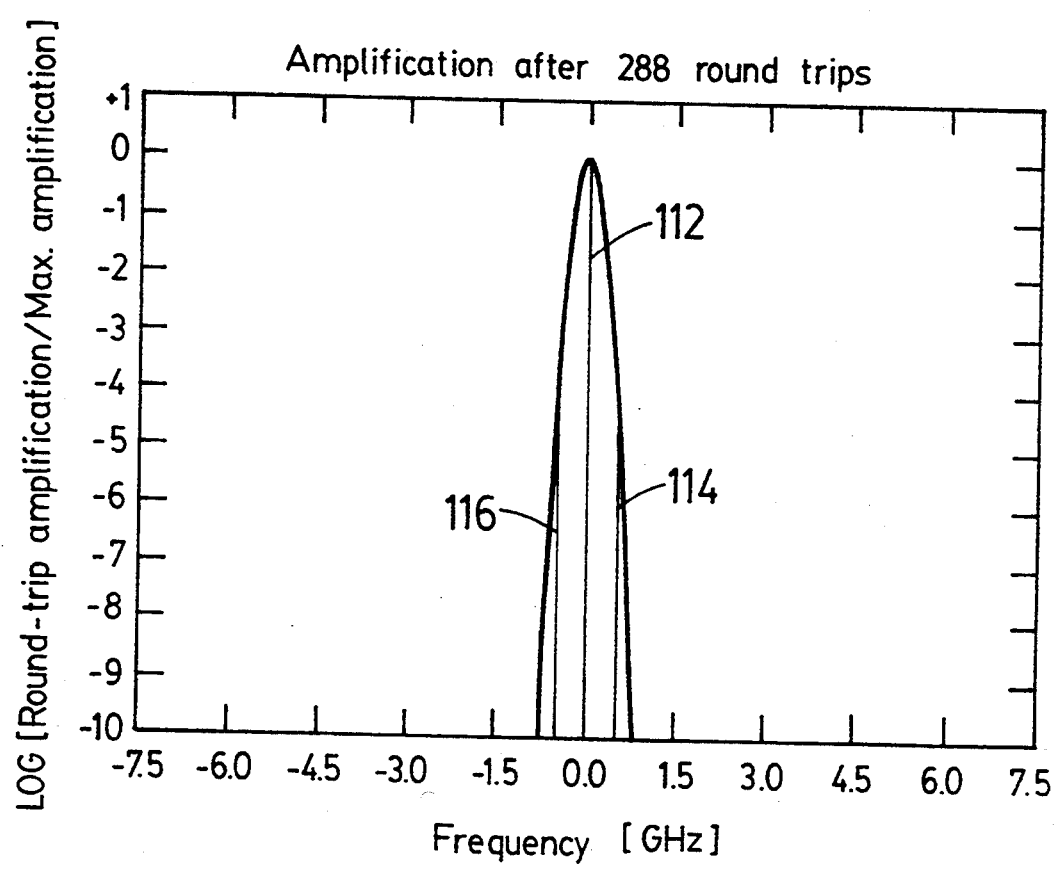
FIG._7

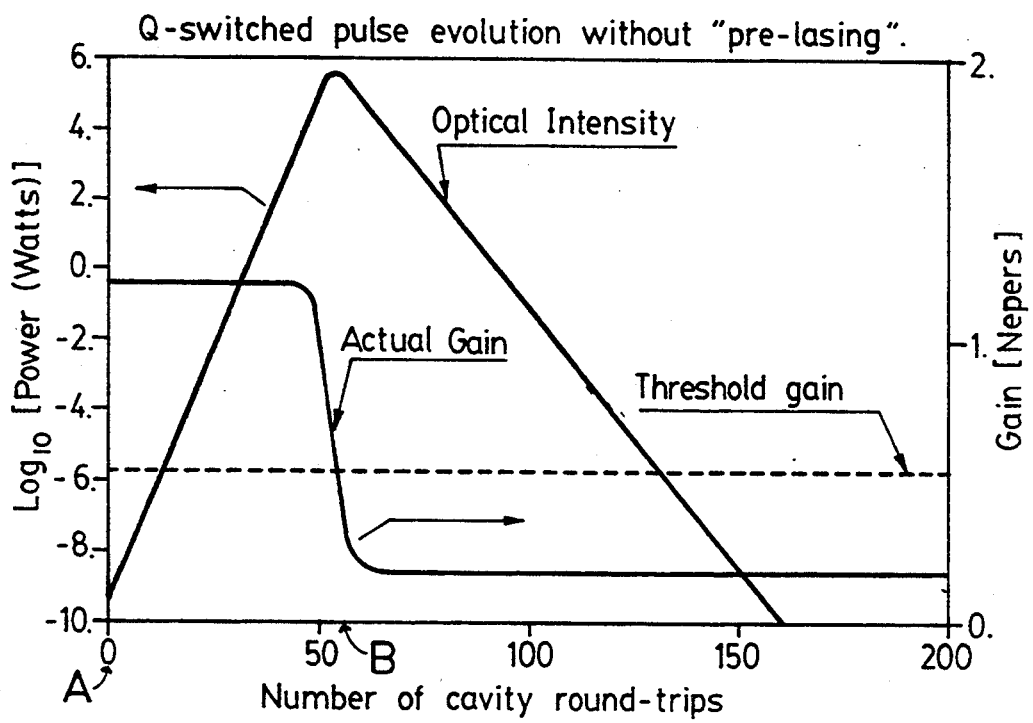
FIG._8.
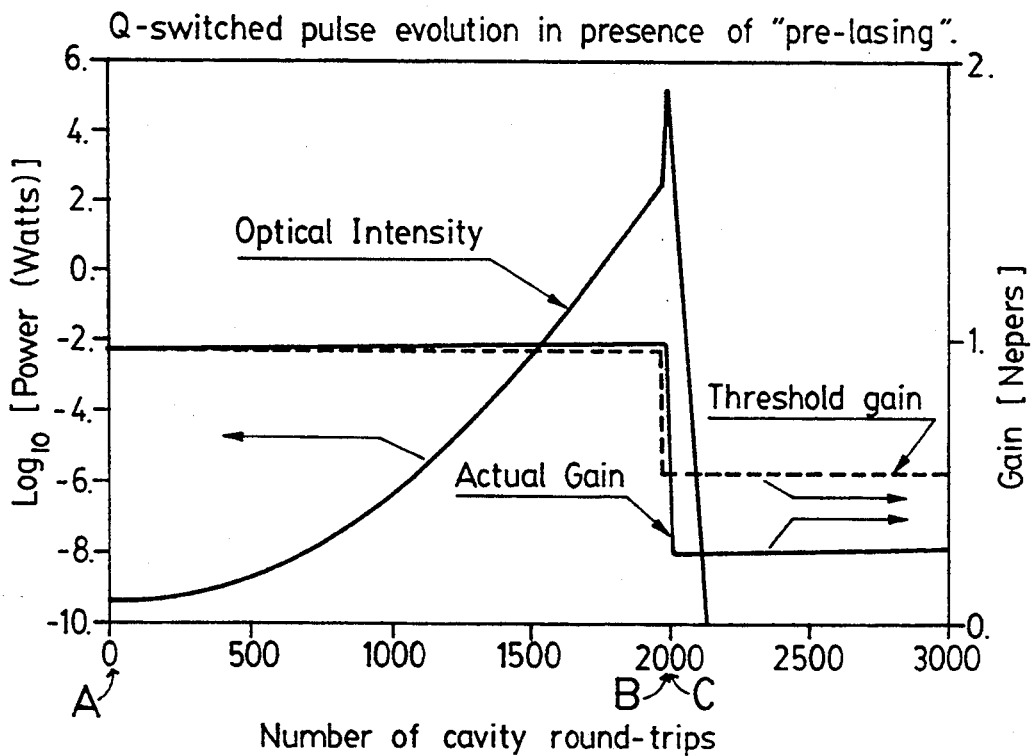
FIG._9.

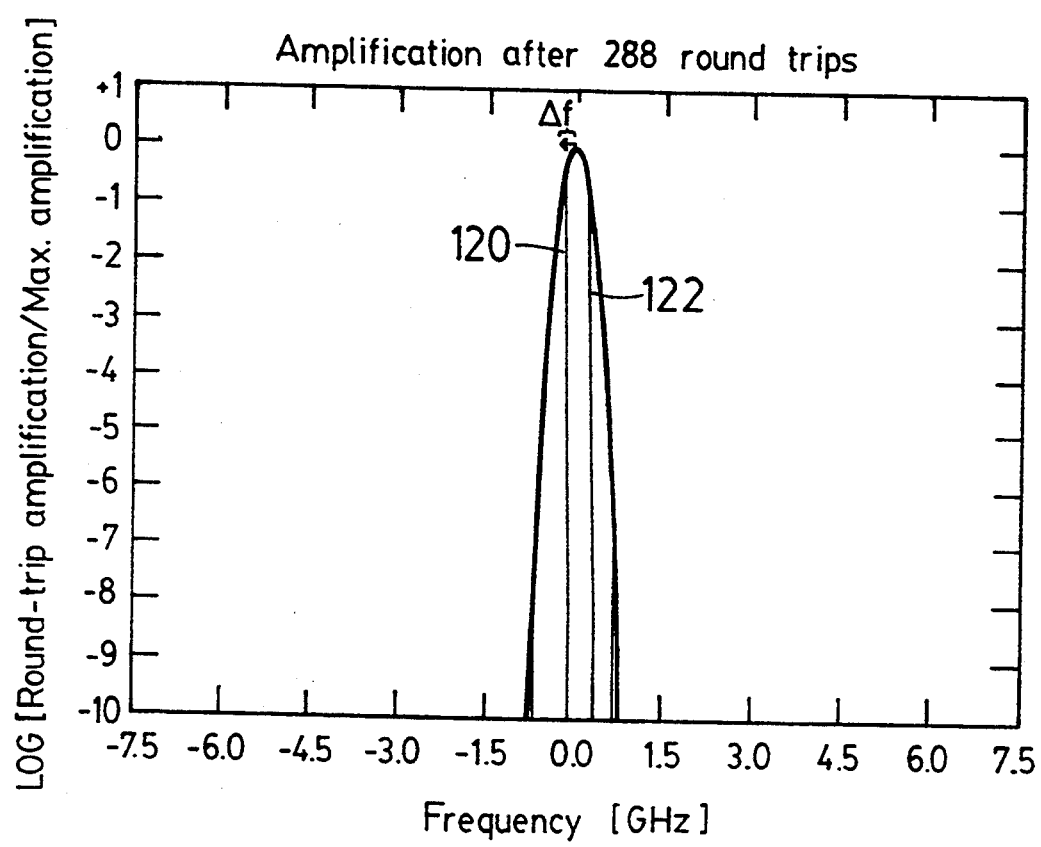
FIG._10.

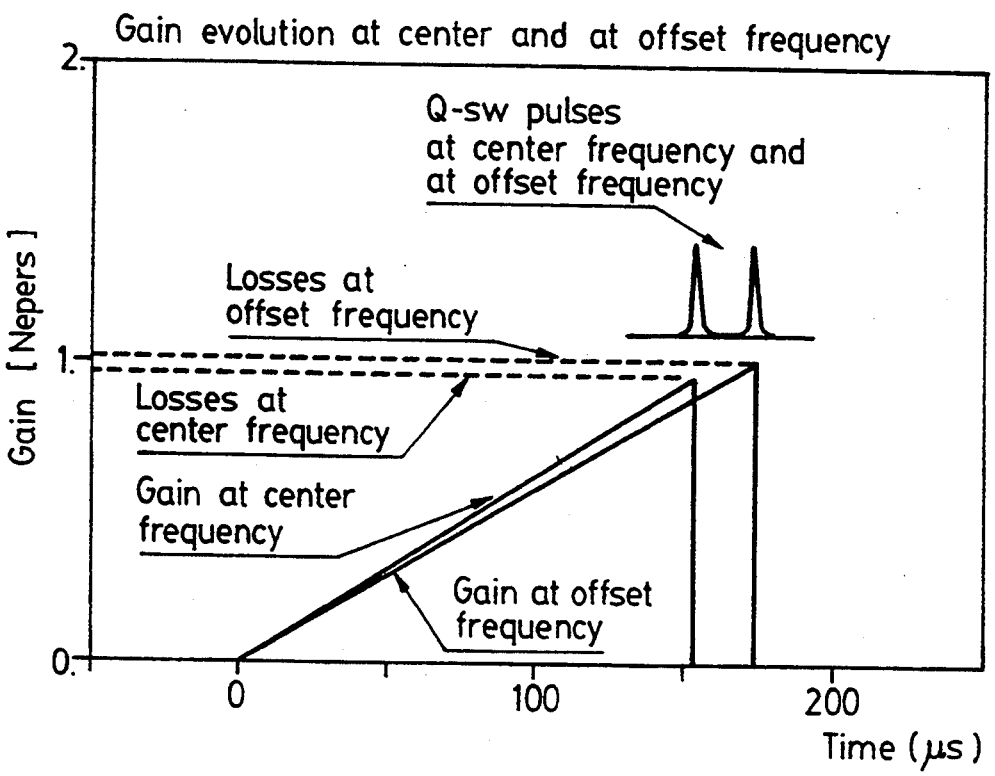
FIG._11.
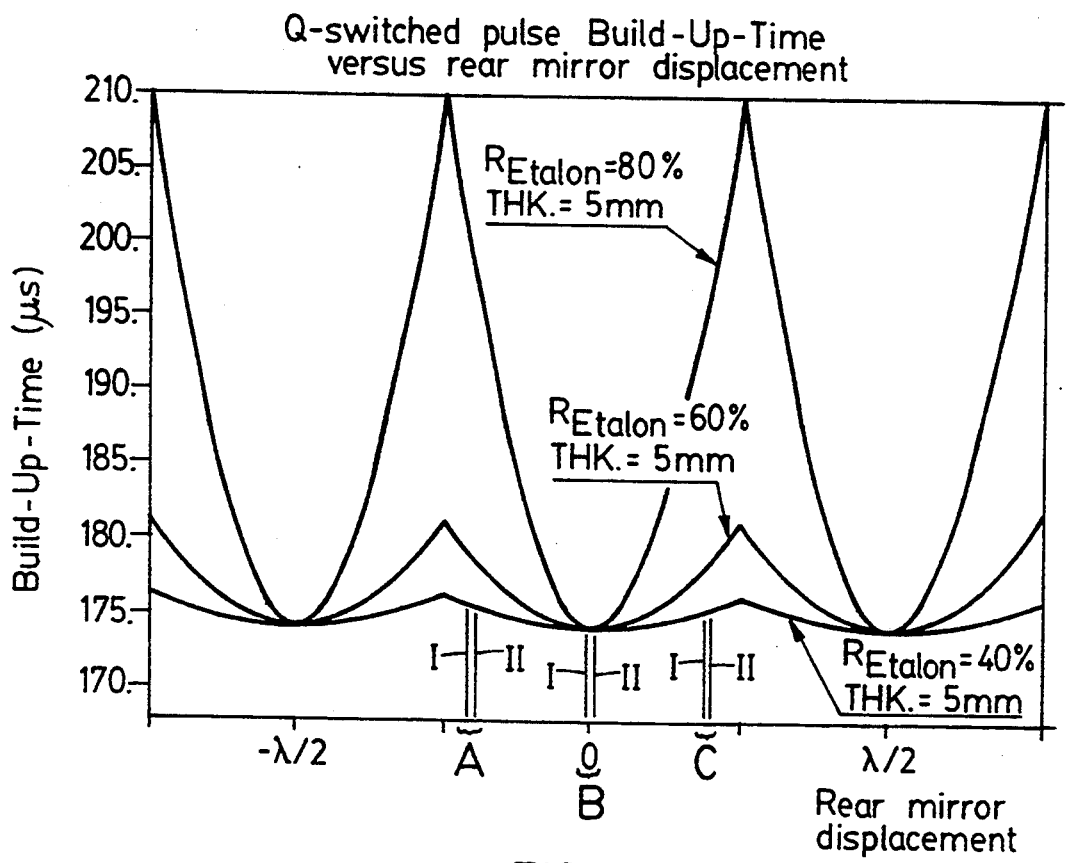
FIG._12.

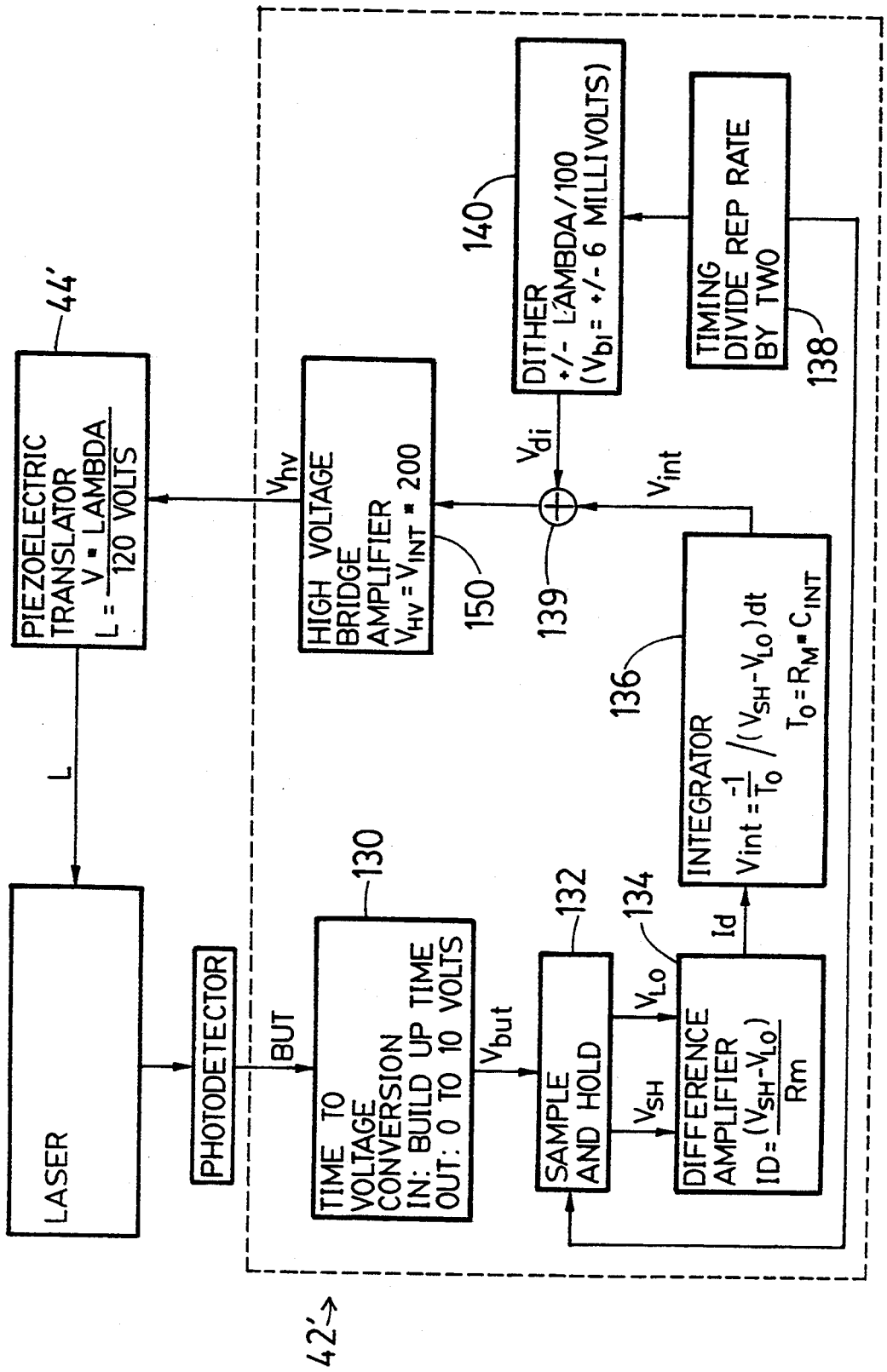
FIG._13.

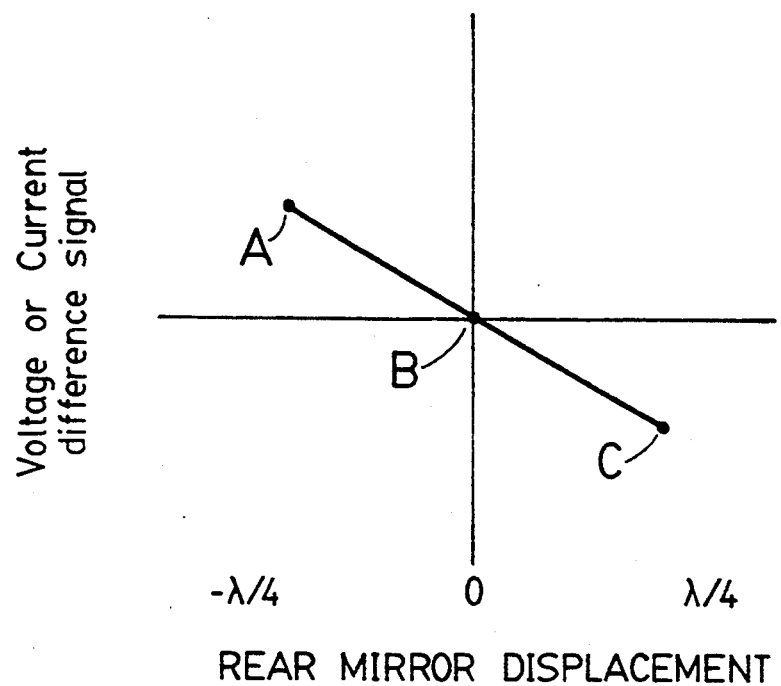
FIG._14.

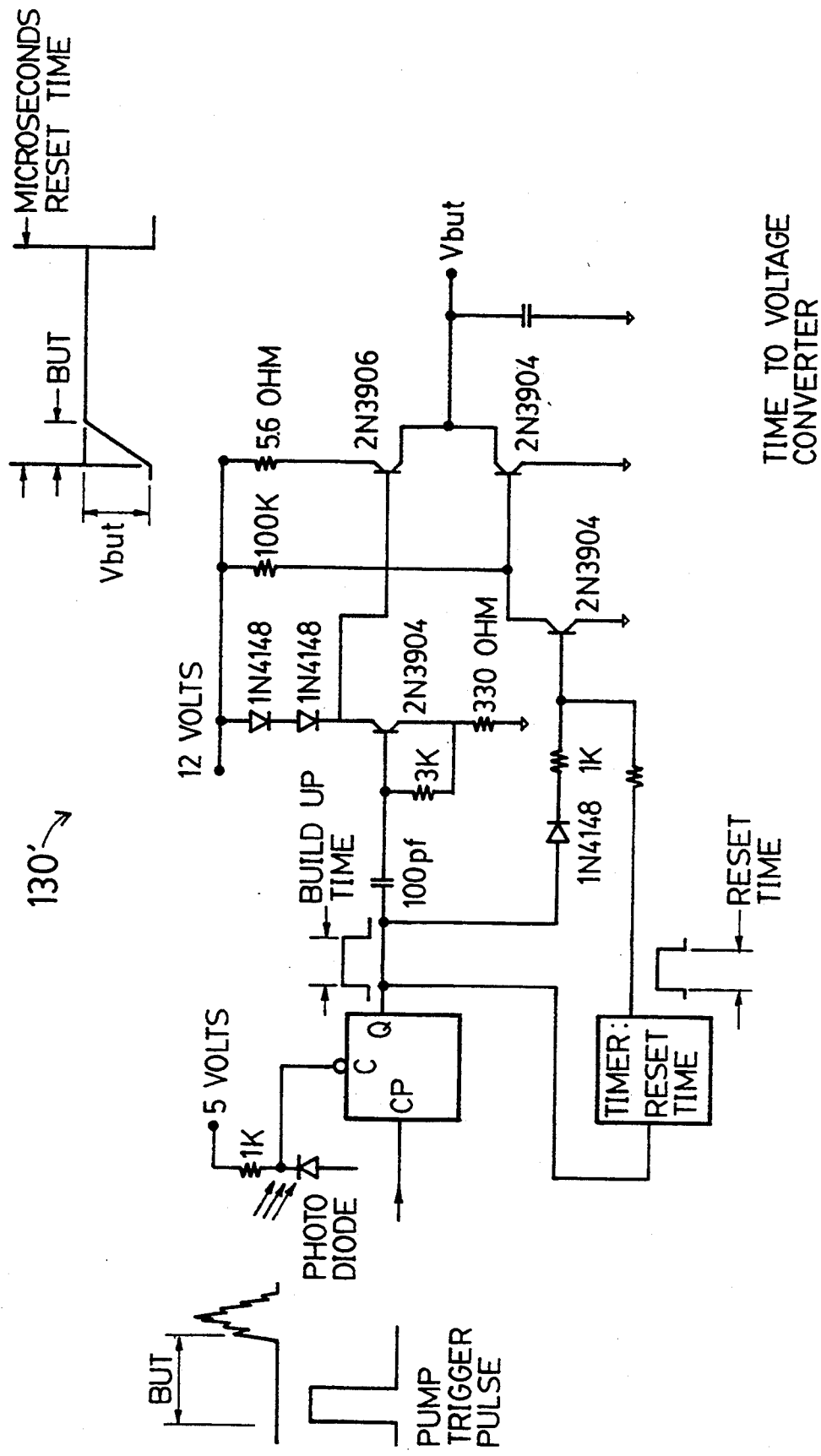
FIG._15.

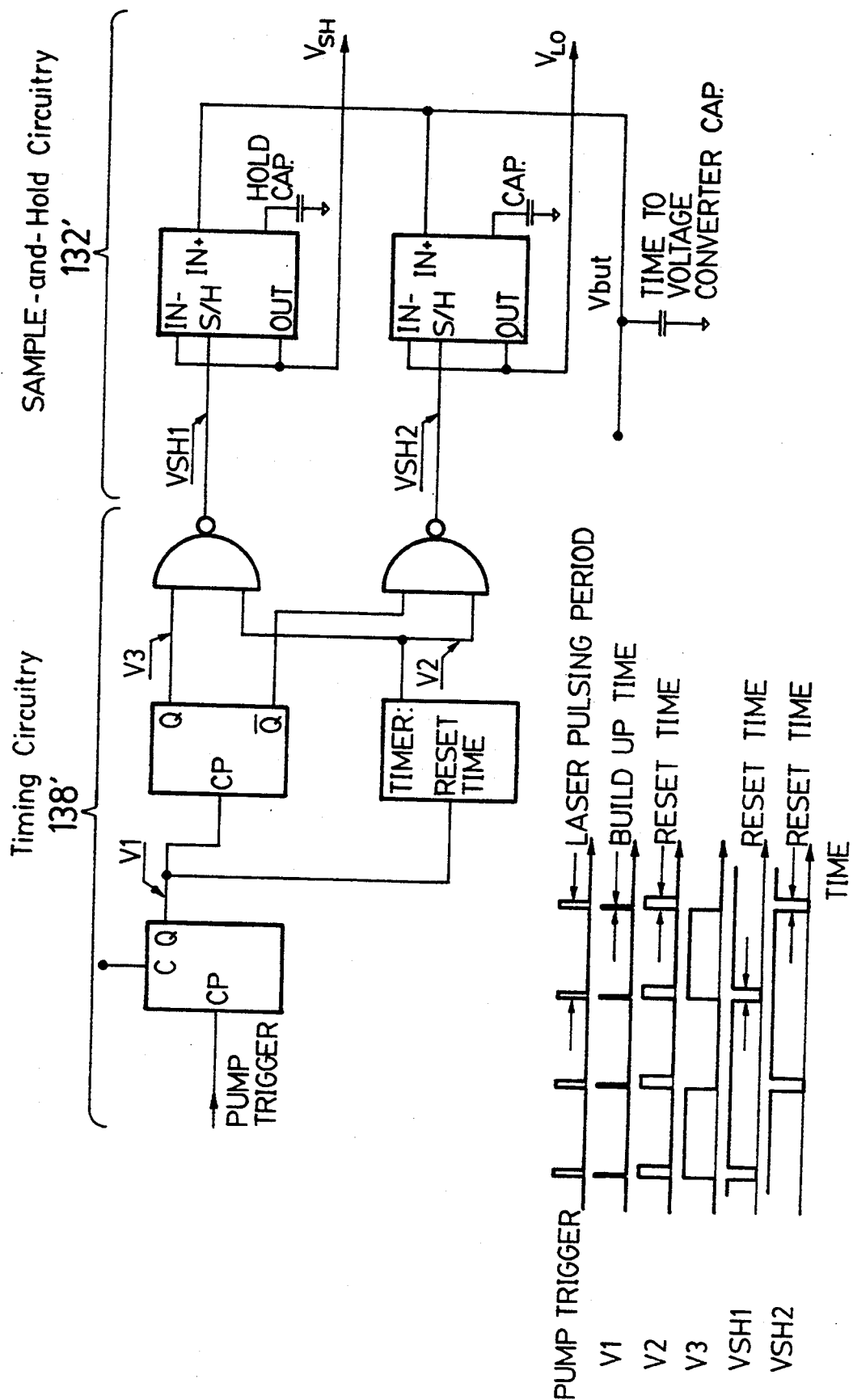
FIG._16.

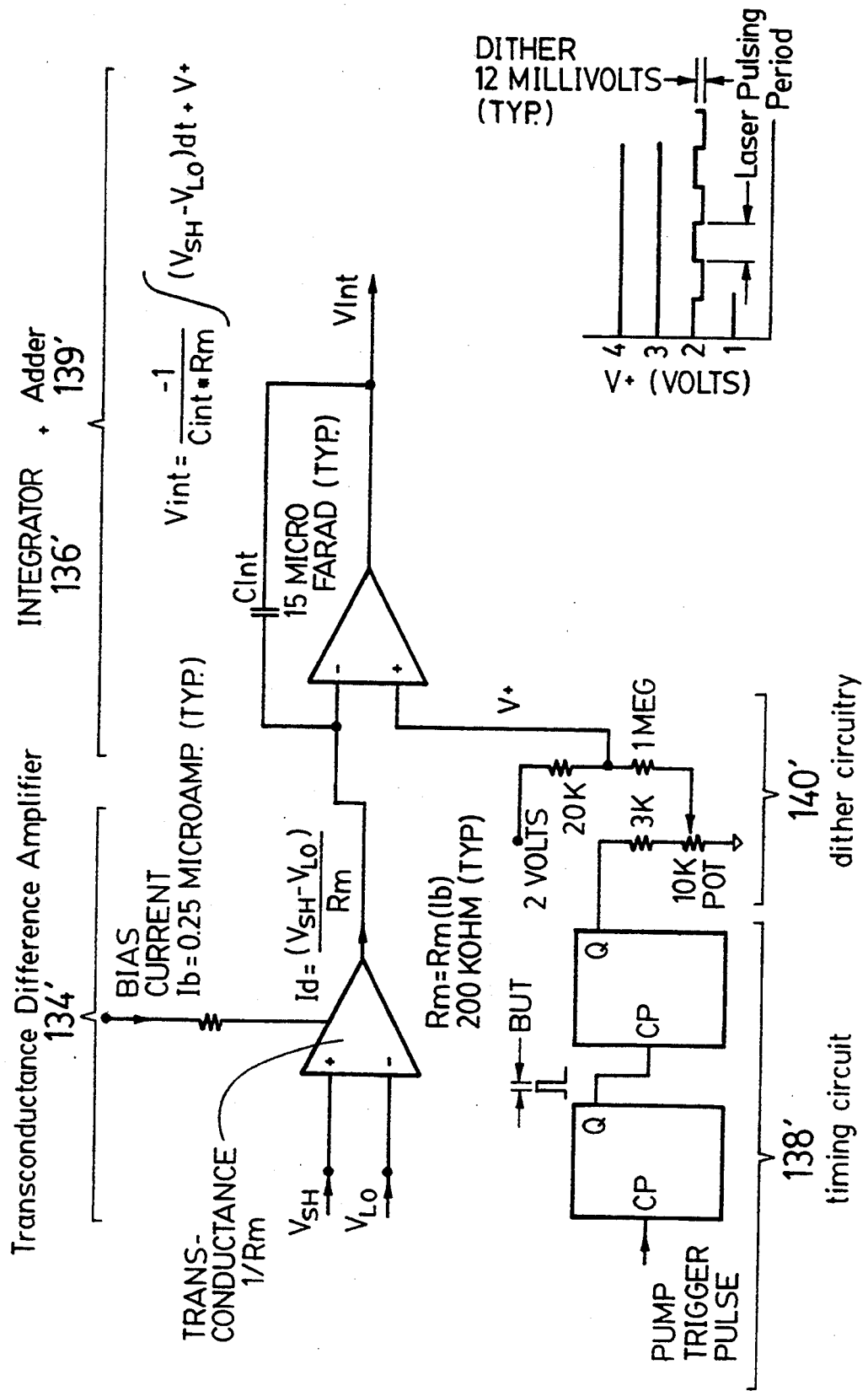
FIG._17.

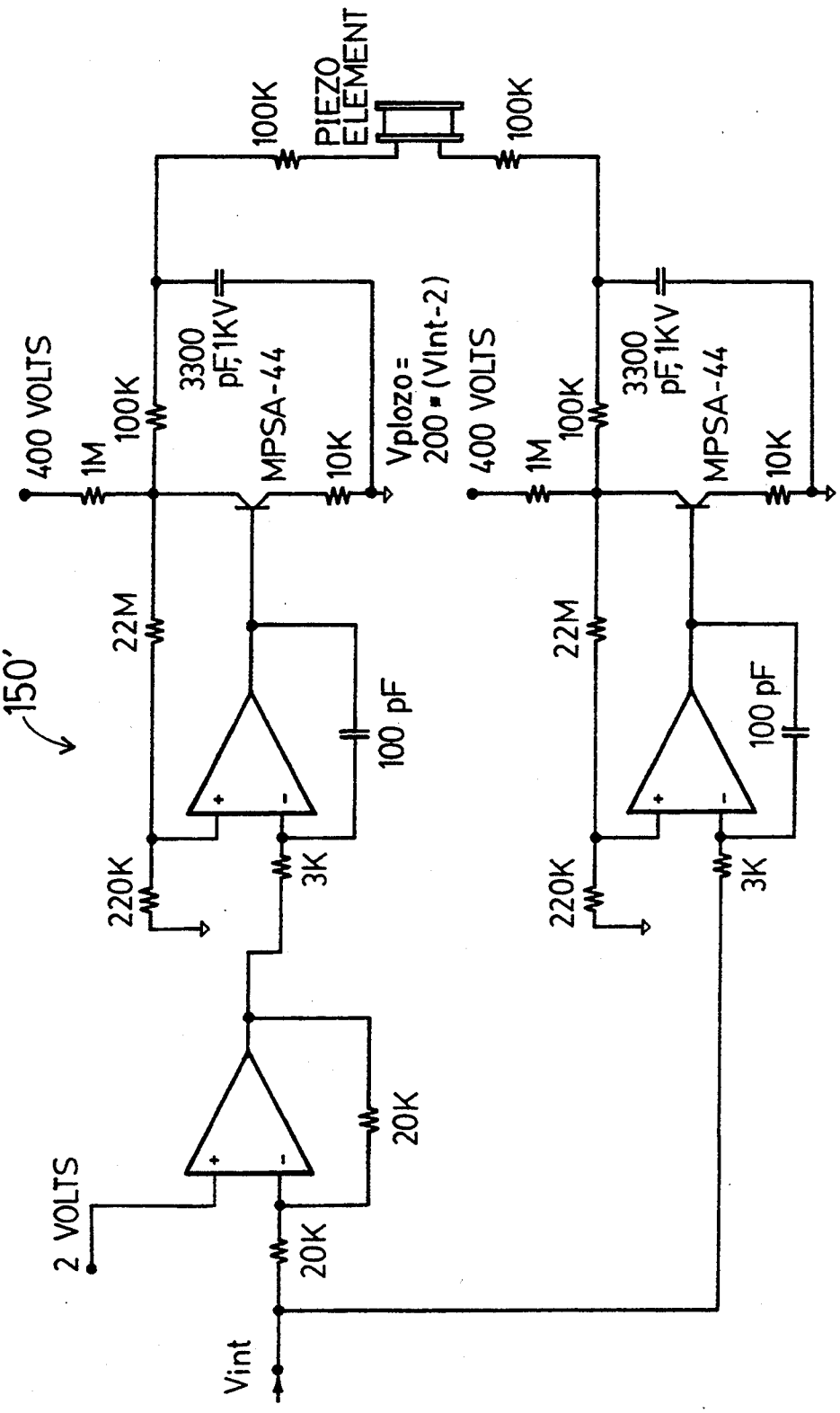
FIG._18.

SINGLE LONGITUDINAL MODE LASER WITHOUT SEEDING

BACKGROUND OF THE INVENTION

The present invention relates to laser devices that produce an output that is substantially a single longitudinal mode. In some applications, it is desired that the output of a laser device be substantially a single longitudinal mode. One benefit of producing a single longitudinal mode output is the reproducibility of the pulse outputs. Reproducibility of pulse outputs is desirable for some measurements or scientific experiments. As discussed below, more than one longitudinal mode in an output will modulate the output. This modulation may be random and unpredictable.

Additionally, the laser device may be used in a system with non-linear crystals. Non-linear crystals are used in frequency doublers, and parametric oscillators or amplifiers. The conversion efficiencies of non-linear crystals may depend upon the pulse-shape of the laser device output. For that reason, it is desired that the laser device output be substantially a single longitudinal mode so that the pulse shape is predictable.

One difficulty maintaining a laser device in a single longitudinal mode is that the cavity length and gain characteristics of the laser device drift with temperature changes.

It is desired to have a laser device that can maintain its output in a single longitudinal mode even when the cavity length and gain characteristics drift with temperature changes.

SUMMARY OF THE INVENTION

An advantage of the present invention is the use of feed-back circuitry to adjust the length of the laser cavity so that substantially only a single longitudinal mode is output from the laser device. The laser device of the present invention does not require any seeding from another laser.

The present invention uses a frequency selective element, such as an étalon, in the laser cavity to narrow the frequency range of the round trip gain characteristics of the laser device. The frequency selective element has a transmissive peak at a certain frequency or frequencies.

Varying the length of the cavity shifts frequencies of the longitudinal modes of the laser device. In this way, the feed-back circuit can maintain the frequency of the single longitudinal mode near a transmissive peak of the frequency selective element.

Maintaining the frequency of a longitudinal mode near the transmissive peak of the frequency selective element is necessary because the cavity length and transmissive characteristics of the frequency selective element can drift with temperature. In many cases, it is impractical to maintain the temperature of the laser device to the precision required to prevent the effects of the temperature drift.

Producing a substantially single longitudinal mode output of a laser device requires that one longitudinal mode be amplified much more than neighboring longitudinal modes. Even relatively small amounts of additional longitudinal mode radiation in the output of the laser device can cause modulation or "beating" in the output.

The feedback circuitry in one embodiment of the present invention minimizes the time between the start of a pump pulse and the detection of "pre-lasing" radiation. The "pre-lasing" radiation shows up as a series of spikes and is often called "relaxation oscillation". The closer the frequency of the longitudinal mode is to the transmissive peak of the frequency selective element the shorter it will take for the "pre-lasing" radiation to appear. The "pre-lasing" radiation is detected soon after the gain of the gain material overcomes the cavity losses. The timing of the "crossover" point is dependent on the cavity losses. The intracavity losses are minimum when the lasing mode coincides in frequency with the frequency selective elements resonance.

The present invention can also use a Q-switch in the laser cavity. The Q-switch can be adjusted so that when the Q-switch is "off" a certain amount of transmission is allowed. This can be done by detuning a quarter-wave plate from its fully "closed" position so that some radiation passes through the Q-switch when it is "off". The detuning of the quarter-wave plate can be adjusted so that "pre-lasing" radiation is detected near the end of the pump pulse so that more of the pump pulse energy is available to the Q-switched output pulse.

Another part of the present invention comprises keeping "pre-lasing" radiation many round trips within the laser cavity before it is output in a Q-switched pulse. The build up of the "pre-lasing" radiation to detectable levels once the gain becomes greater than the cavity loses is relatively slow since the gain is only slightly greater than the intracavity losses. It can take thousands of round trips in order to build up the "pre-lasing" radiation to detectable levels. The large number of round trips within the cavity greatly increases the frequency selectivity of the laser device. The detected "pre-lasing" radiation is for that reason substantially a single longitudinal mode. Once the pre-lasing radiation is detected, the Q-switch switch is turned on and the amplification of the laser device radiation is greatly increased. The "pre-lasing" radiation is quickly amplified into a Q-switched giant pulse which maintains the substantially single longitudinal mode character of the "pre-lasing" radiation.

BRIEF DESCRIPTION OF THE DRAWINGS

The above and other features and aspects of the present invention will become more apparent upon reading the following detailed description in conjunction with the accompanying drawings, in which:

FIG. 1 is a graph that shows a computer simulation of the modulation of a Q-switched pulse where the main longitudinal mode is modulated by a neighboring longitudinal mode;

FIG. 2 is a schematic view of the laser device of the present invention.

FIG. 3 is a graph that shows a computer simulation of the Lorenzian gain profile of the gain material for a single pass amplification.

FIG. 4 is a graph of a computer simulation showing the transmissive peaks of an étalon.

FIG. 5 is a graph of a computer simulation showing the round trip amplification in the laser device of the present invention.

FIG. 6 is a graph of a computer simulation of the amplification in the laser device after 10 round trips.

FIG. 7 is a graph of a computer simulation showing the amplification in the laser device after 288 round trips.

FIG. 8 is a graph of a computer simulation showing Q-switched pulse evolution without "pre-lasing".

FIG. 9 is a graph of a computer simulation showing Q-switched pulse evolution in the presence of "pre-lasing".

FIG. 10 is a graph of the amplification of the laser device after 288 round trips showing the effects of temperature drift.

FIG. 11 is a graph of a computer simulation showing the gain evolution at a center and at an offset frequency.

FIG. 12 is a graph of a computer simulation showing the "pre-lasing" radiation Build-up-Time versus rear mirror displacement.

FIG. 13 is a block diagram showing an embodiment of the feedback circuit 42' of the present invention.

FIG. 14 is a graph of a voltage or current error signal created by the feedback circuitry for sets A, B, and C of FIG. 12.

FIG. 15 is a schematic showing time-to-voltage converter.

FIG. 16 is a schematic showing timing circuitry and Sample-and-Hold circuit.

FIG. 17 is a schematic showing a difference amplifier, Integrator and adder, timing circuitry and dither circuitry.

FIG. 18 is a schematic showing the High Voltage Bridge Amplifier.

DETAILED DESCRIPTION OF THE PREFERRED EMBODIMENT

FIG. 1 is a graph that shows a computer simulation of a Q-switched pulse where a main longitudinal mode is modulated by a neighboring longitudinal mode. The modulation is a waveform having a frequency equal to the frequency difference between the main and neighboring longitudinal modes. Ideally, the neighboring longitudinal modes are completely suppressed. In practice, this is not possible but the modulation depth can be kept below some predetermined amount. As seen in FIG. 1., the modulation depth is defined as M/A. The modulation depth is related to the intensity of the main and side longitudinal modes by the equation $$\text{Modulation Depth} \simeq \sqrt[4]{\frac{I_n}{I_m}}$$

wherein the output intensity of the main longitudinal mode is $I_m$ and the output intensity of the neighboring mode is $I_n$. For this reason, in order to keep the modulation depth below 4%, it is necessary that $$\frac{I_n}{I_m} \leq 10^{-4}$$

FIG. 2 is a schematic view of the laser device 20 of the present invention. The laser device 20 is designed to produce substantially single longitudinal mode radiation. In a preferred embodiment, the laser device will make use of second and fourth harmonic generation in nonlinear crystals (not shown) to generate nanosecond pulses at 266 nm, at a repetition rate of 300 Hz. Pulse-to-pulse energy stability in the harmonics is desired since one of the foreseen applications of the machine will be in micro-electronics and micromachining. Due to the unpredictable effects of the modulation by side longitudinal modes, the modulation depth of the Q-switched output of the laser device 20 must be minimized.

The laser device 20 defines laser cavity between the rear mirror 22 and output mirror 24. The laser device will support longitudinal modes at frequencies such that the cavity length is equal to an integer number of half-wavelengths. The cavity length in a preferred embodiment is 20 cm so that the free spectral range of the resonator, or the frequency separation between longitudinal modes, is about 0.75 Ghz.

Arranged in the laser cavity is the gain material 26. The gain material 26 is preferably made of Nd:YAG. Nd:YAG is a well known laser material with a peak absorption frequency of 808 nm. Other gain materials can be used in the present invention, such as Nd:YLF, Nd:YVO4, Nd:Doped Glass, or any other lasant material. The gain material 26 is pumped by stacks 28 of laser diode bars positioned along opposite sides of the gain material 26. The gain material 26 has Brewster angled ends to define the preferred polarization of the laser beam.

FIG. 3 is a graph that shows a computer simulation of the Lorenzian gain profile of the gain material for a single pass amplification. The frequency scale along the bottom shows the frequency difference from the center frequency of the gain material.

Looking again at FIG. 2, a frequency selective element 30 such as a Fabry-Perot étalon is placed in the laser cavity. The étalon is a piece of glass or fused-silica with parallel faces having a reflective coating placed on the faces. In a preferred embodiment, the étalon comprises a 5 mm thick slab of fused-silica with a 40% reflective coating on the faces. The étalon is available from CVI located in Albuquerque, N. Mex.

FIG. 4 is a graph of a computer simulation showing the transmissive peaks 100, 102 and 104 of an étalon. The étalon has transmissive peaks, such as transmissive peaks 100,102 and 104, of near 100% transmission at frequencies such that the étalon optical length is equal to an integer number of half-wavelengths.

The étalon can be placed on a temperature controlled mount (not shown) to get some control of the frequency of a transmissive peak of the étalon using the 2.7 Ghz/°C. tuning coefficient for fused silica étalons. In this manner, the transmissive peak 102 of the étalon can be placed near the center frequency (shown in FIG. 3) of the gain material 26, shown in FIG. 2.

The frequency selective element may alternately be a resonant reflector. The resonant reflector is comprised of two slabs of a high refractive index material such as YAG separated by a spacer. One of the slabs has parallel faces. The spacer also has parallel faces so that three faces of the two slabs are parallel to each other. The fourth face of the slabs has an anti-reflective coating placed thereon. The fourth face need not be parallel to the other three faces. The resonant reflector has reflectivity peaks at close to 51% reflectivity. This resonant reflector could be used as an output mirror of the laser device. In this manner, the "pre-lasing" radiation having frequencies close to a reflectivity peak of the resonant reflector would be maintained within the laser cavity longer. A large number of round trips within the cavity will sharpen this frequency selective effect.

FIG. 5 is a graph of a computer simulation showing the round trip amplification in the laser device of the present invention. This graph shows the effects of the Lorenzian lineshape of the gain material, the étalon transmissive peaks and shows the positions of different longitudinal modes.

The preferred embodiment of the present invention has "pre-lasing" radiation staying within the laser cavity for a large number of round trips so as to reduce the modulation depth of the Q-switched output. This effect can be seen in FIGS. 6–7. FIG. 6 is a graph of a computer simulation of the amplification in the laser device after 10 round trips. Note that the amplification of the neighboring longitudinal modes 108 and 110 are within an order of magnitude of the amplification of the main longitudinal mode 106. FIG. 7 is a graph of a computer simulation showing the amplification in the laser device after 288 round trips. In this case, the amplification of the neighboring longitudinal modes 114 and 116 is $10^{-4}$ times the amplification of the main longitudinal mode 112. This means that the modulation depth of a Q-switched pulse will be about 4% if the Q-switched pulse maintains this amplification ratio. As discussed below, in a preferred embodiment, the "pre-lasing" radiation makes over 1000 round trips within the cavity.

Looking again at FIG. 2, one way of causing the "pre-lasing" radiation to make many trips within the laser cavity involves the Q-switch 32. The Q-switch 32 comprises a quarter-wave plate 34 and a Pockels cell 36. In the typical Q-switch operation, transmission through the Q-switch is very low when the Q-switch is off, and high when the Q-switch is switched on so that an output Q-switched pulse quickly uses the energy stored in the gain material. FIG. 8 is a graph of a computer simulation showing Q-switched pulse evolution without "pre-lasing". Before time A, the Q-switch is off so that the gain in the laser device is smaller than the threshold gain set by the laser devices losses. The gain material can be pumped with a pump pulse in this period without losing energy due to lasing. At time A, the Q-switch is turned on, dropping the threshold gain. From time A to time B (at about 60 round trips), the actual gain is much greater than the threshold gain so that lasing occurs very rapidly. Within about 60 round trips the energy within the gain material is used up so that the actual gain drops below the threshold gain at time B. For the system shown in FIG. 8, a single longitudinal mode output cannot be maintained since there is not enough passes through the étalon to adequately suppress the neighboring longitudinal modes.

Looking again at FIG. 2, a small detuning in the quarter-wave plate 34 from its fully closed orientation can increase the transmission through the Q-switch in its "off" state from a nominally zero amount to an amount proportional to $\sin^2(2\Psi)$ where $\Psi$ is the quarter-wave plate detuning angle. As discussed below, the quarter-wave plate can be detuned until "pre-lasing" radiation is detected near the end of the pump period.

FIG. 9 is a graph of a computer simulation showing Q-switched pulse evolution in the presence of "pre-lasing". At time A, the gain in the laser device becomes greater than the threshold gain of the system and "pre-lasing" begins. From time A to time B, the actual gain increases linearly as the gain material is pumped. The difference between the actual gain and the threshold gain is small, however, so that it takes many cavity round-trips for the optical intensity in the laser cavity to build up to a detectable intensity. Because of the over a thousand round-trips in the laser cavity, the "pre-lasing" radiation is overwhelmingly one single longitudinal mode. At time B, the "pre-lasing radiation" is detected and the Q-switch is turned on. The "pre-lasing" radiation is quickly amplified into a Q-switched output pulse that maintains the substantially single longitudinal mode character of the "pre-lasing" pulse. The Q-switched output pulse quickly uses up the pump pulse energy stored in the gain material so that at time C the actual gain is below the threshold gain.

Looking again at FIG. 2, a polarizer 38 deflects some cavity radiation to a sensor such as photo-diode 40. When the photo-diode 40 detects a certain level of "pre-lasing" radiation the Q-switch 32 is turned on.

A problem with maintaining the Q-switched output as substantially a single longitudinal mode is temperature drift in the laser device. The frequencies of the longitudinal modes drift with temperature due to the thermal expansion of the laser cavity. A figure for this thermal drift may be around 7 Ghz/°C. for the frequencies and temperatures of interest. The transmission peaks of the étalon and the peak of the gain material also drift with temperature changes. For some applications, maintaining the desired temperature stability with an oven would be impractical.

FIG. 10 is a graph of the amplification of the laser device after 288 round trips showing the effects of temperature drift. This figure shows a frequency shift, $\Delta f$, of half the free spectral range or longitudinal mode separation. This frequency shift could be the result of a combination of any of the temperature drifts discussed above. The result of this temperature drift is that the intensity of longitudinal modes 120 and 122 are equal and the laser device is far from a single longitudinal mode output. Of course, smaller frequency shifts will also increase the modulation depth of the Q-switched output. It is impractical to control the temperature accurately enough to maintain the output in a substantially single longitudinal mode output over long periods of time.

Looking again at FIG. 2, the laser device 20 is maintained in a substantially single longitudinal mode by the feedback circuitry 42 and piezoelectric actuator 44. The piezo-electric actuator 44 is attached to the rear mirror 22. A change of the voltage input to the piezo-electric actuator 44 adjusts the cavity length by a certain small amount. Changing the cavity length shifts the frequencies of the longitudinal modes. The feedback circuitry 42 is adapted to control the piezoelectric actuator 44 so as to adjust the length of the laser cavity so that a longitudinal mode of the laser device is near the frequency of a transmission peak of the frequency selective element 30. One way of maintaining a longitudinal mode near the frequency of a transmission peak of the frequency selective element 30 is to minimize the period of time between the beginning of a pump pulse to the gain material 26 and the detection of the "pre-lasing" radiation in the laser cavity.

FIG. 11 is a graph of a computer simulation showing the gain evolution at a center and at an offset frequency. If the pump pulse to the gain material is rectangular, the gain within the laser device will grow at a linear rate during the pump pulse. The slope of the gain will be slightly higher at the center frequency rather than at the offset frequency. More importantly the losses will be greater at the offset frequency than at the center frequency. The center frequency is at the frequency of a transmissive peak of the frequency selective element. The "pre-lasing" radiation is detected soon after the gain over takes the losses. The detection time of the "pre-lasing" radiation is the shortest at the frequency of the transmissive peak of the frequency selective element. As discussed above, adjusting the quarter-wave plate also adjusts the level of the losses so that the "crossover" point can be set near the end of the pump pulse. In this manner, the Q-switched output pulse can use as much of the pump energy as possible.

FIG. 12 is a graph of a computer simulation showing the "pre-lasing" radiation Build-up-Time versus rear mirror displacement. At Zero displacement, one longitudinal mode is at the frequency of a transmissive peak of the étalon. At λ/4 displacement, two longitudinal modes are equally transmitted through the étalon as was shown in FIG. 10.

FIG. 13 is a block diagram showing an embodiment of the feedback circuit 42' of the present invention. In one embodiment, the feedback circuit 42' causes the cavity length to alternate on different pump pulses between different lengths and the feedback circuitry 42' attempts to minimize the difference between the build-up-times at the two lengths. The time to voltage converter 130 converts the build-up-time into a voltage. This voltage is sent to a sample-and-hold circuit 132. When two voltages are stored in the sample-and-hold circuitry 132 corresponding to two different dithered cavity lengths, these voltages are sent to a difference amplifier 134. This difference is the error signal used by the feedback circuit.

Looking again at FIG. 12, three sets of dithered rear mirror displacements A, B, and C are shown. For set A, position I has a greater build up time than position II. For set B, position I has an equal build up time as position II. For set C, position I has a lesser build up time than position II. FIG. 14 is a graph of a voltage or current error signal created by the feedback circuitry for sets A, B, and C of FIG. 12. The feedback circuitry will work to set the error signal as close to zero as possible.

Looking again at FIG. 13, the error signal is an indication of the desired change in position of the piezoelectric actuator 44'. This error signal is sent to an integrator 136 to get a voltage indication, $V_{int}$, of a desired position of the piezoelectric actuator 44'. This voltage, $V_{int}$, is added to the alternating positive and negative dither voltage $V_{dl}$. The high voltage bridge amplifier 150 produces a voltage, $V_{hv}$, which is a multiple of the input voltage. This voltage $V_{hv}$ is used to drive the piezoelectric actuator 44'.

Due to the feedback circuit 42', the length of the cavity will change so that a longitudinal modes will track the peak transmissive frequency of the étalon. If because of a temperature shift, the peak transmissive frequency of the étalon increases or decreases, the length of the cavity will shift so a longitudinal mode is near the peak transmissive frequency of the étalon. If because of a temperature shift, the cavity length increases or decreases, the length of the cavity will shift back due to the feedback circuitry. The dithering caused by the feedback circuitry 42' means that a longitudinal mode is not exactly at a peak transmissive frequency of the étalon. Due to the large number of round-trips of the "pre-lasing" radiation in the laser cavity, a substantially single longitudinal mode output is produced. This single longitudinal mode output can be maintained indefinitely due to the feedback circuit.

The feedback circuit discussed above will work in a similar manner if instead of placing an étalon in the laser cavity a resonant reflector is used as an output mirror. At a reflectivity peak of the resonant reflector, the build-up-time of the "pre-lasing" radiation will be at a minimum because more of the "prelasing" radiation will be reflected back into the laser cavity. In order to minimize the build-up-time, the feedback circuit will adjust the cavity length so that a longitudinal mode of the laser cavity is close to the reflectivity peak of the resonant reflector.

FIGS. 15–18 show a preferred embodiment of the feedback circuit. FIG. 15 is a schematic showing time-to-voltage converter 130'. The reset time for a preferred embodiment is about 250 μsecs. FIG. 16 is a schematic showing timing circuitry 138' and Sample-and-Hold circuit 132'. FIG. 17 is a schematic showing difference amplifier 134', Integrator 136' and adder 139', timing circuitry 138' and dither circuitry 140'. FIG. 18 is a schematic showing the High Voltage Bridge Amplifier 150'.

The feedback circuit could be designed in a different manner than that described above. For example, the feedback circuit could be implemented in a "digital" rather than "analog" fashion. Additionally, the feedback circuit could include a computer which uses a computer program to control the level of feedback.

Looking again at FIG. 2, pin hole 46 is placed in the cavity to ensure the output is a $TEM_{00}$ transverse mode rather than some higher order transverse mode. Cylindrical lens 48 and spherical lens 50 may also be placed in the laser cavity to shape the mode volume in the cavity and maximize energy extraction.

In a preferred embodiment, the piezoelectric actuator 44 is available from the DDO Corporation, Electro-Ceramic division located in Salt Lake City, Utah; the Pockels cell 36 is available from Inrad Incorporated located in North Vale, N.J.; and the gain material 26 is available from Litton Airtron located in Charlotte, N.C.

Various details of the implementation and method are merely illustrative of the invention. It is to be understood that various changes in such details may be within the scope of the invention, which is to be limited only by the appended claims.

What is claimed is:

1. A laser device comprising:
   a laser cavity defined by two end mirrors;
   a frequency selective element arranged in said laser cavity, said frequency selective element having a transmissive peak;
   a gain material arranged in the laser cavity; and
   feedback circuitry adapted to adjust the length of the laser cavity so that a longitudinal mode of the laser device is near the frequency of the transmission peak of the frequency selective element.

2. The laser device of claim 1, wherein the frequency selective element comprises an étalon.

3. The laser device of claim 1, wherein the gain material is connected to a pumping means for providing pulses of pump energy to the gain material and wherein the laser device further comprises a sensor adapted to detect the production of a certain amount of pre-lasing radiation in the laser cavity and wherein said feed-back circuitry comprises circuitry to minimize a build-up-time between the beginning of a pump pulse and the detection of a certain level of pre-lasing radiation in the laser cavity.

4. The laser device of claim 3, wherein the feedback circuit causes the cavity length to alternate on different pump pulses between a first and second length and wherein the time minimizing circuit includes circuitry that attempts to minimize the difference between the build-up-time at the first length and the build-up-time at the second length.

5. The laser device of claim 1, wherein the feedback circuit is connected to a piezoelectric actuator to move one of the mirrors so as to adjust the cavity length.

6. The laser device of claim 5, further comprising a Q-switch arranged in the laser cavity, said Q-switch including a Pockels cell and a quarter-wave plate.

7. The laser device of claim 6, wherein the quarter-wave plate is oriented slightly off its fully closed orientation so that when the Q-switch is in its off state the transmission through the Q-switch is increased and so that the detection of the pre-lasing radiation occurs near the end of the pump pulses.

8. The laser device of claim 7, wherein the Q-switch is switched on upon the detection of the pre-lasing radiation.

9. The laser device of claim 1, wherein the feed-back circuitry maintains the output of the device in a substantially single longitudinal mode.

10. A laser device comprising:
a laser cavity defined by two end mirrors; one of said end mirrors comprising a frequency selective element having a reflective peak;
a gain material arranged in the laser cavity; and
feedback circuitry adapted to adjust the length of the laser cavity so that a longitudinal mode of the laser device is near the frequency of the reflective peak of the frequency selective element.

11. The laser device of claim 10, wherein the frequency selective element comprises a three-surface resonant reflector.

12. The laser device of claim 11, wherein the three-surface resonant reflector is formed with two YAG slabs separated from one another by a spacer, wherein one YAG slab has a anti-reflective coating on one surface so that only three of the four surfaces of the YAG slabs are reflective and wherein the three surfaces are parallel.

13. A method of forming a substantially single longitudinal mode output in a laser device with a cavity defined by two end mirrors, said method comprising
arranging a frequency selective material having a transmissive peak in the cavity;
amplifying radiation in the laser cavity with a gain material;
automatically changing the length of the laser cavity so that a longitudinal mode of the laser device has a frequency near the transmissive peak of the frequency selective material.

14. The method of claim 13, wherein the automatic changing step is done such that the output of the longitudinal mode is at least ten-thousand times greater than the output of nearby modes.

15. The method of claim 13, wherein said amplifying step comprises pumping the gain material with a pump pulses and wherein the automatic changing step comprises the step of minimizing the build-up-time between the beginning of the pump pulses and the production of a certain level of pre-lasing radiation in the laser cavity.

16. The method of claim 15, wherein the automatic changing step comprises dithering the cavity length and minimizing the difference between the build-up-times of consecutive pulses.

17. The method of claim 13, further comprising the steps of arranging a Q-switch in the laser cavity.

18. The method of claim 17, further comprising the step of keeping "pre-lasing" radiation a long time within the laser cavity before triggering a Q-switch to produce a Q-switched pulse.

19. The method of claim 18, wherein said long time is about a thousand round trips or more.

20. The method of claim 18, further comprising pumping the gain material with a pump pulse and setting the transmission of the Q-switch in its "off" state such that a certain level of pre-lasing radiation is produced near the end of the pump pulse.

21. The method of claim 18, further comprising the step of switching the Q-switch "on" upon the detection of pre-lasing radiation in the cavity.

22. A method of forming a substantially single longitudinal mode output in a laser device with a cavity defined by two end mirrors, said method comprising
providing a frequency selective element having a reflective peak as one of said two end mirrors;
amplifying radiation in the laser cavity with a gain material;
automatically changing the length of the laser cavity so that a longitudinal mode of the laser device has a frequency near the reflective peak of the frequency selective material.

23. The method of claim 22, wherein said providing step comprises providing a resonant reflector as said frequency selective element.

* * * * *